Feb. 16, 1932.  G. E. KOONTZ  1,845,291
PASTE DISPENSING CABINET
Filed July 25, 1929  2 Sheets-Sheet 1
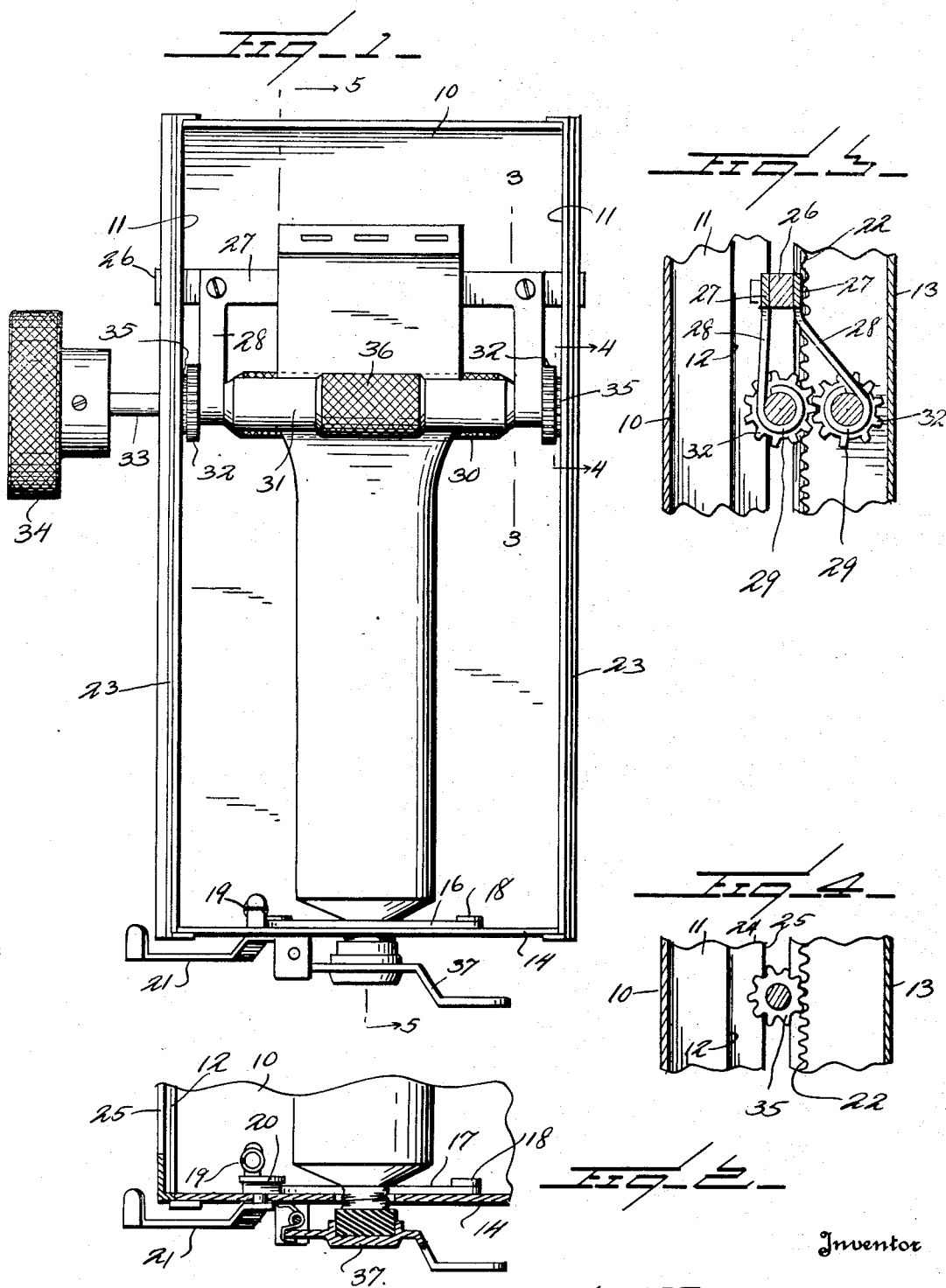
Inventor
G. E. Koontz
By Watson E. Coleman
Attorney Feb. 16, 1932.  G. E. KOONTZ  1,845,291
PASTE DISPENSING CABINET
Filed July 25, 1929  2 Sheets-Sheet 2
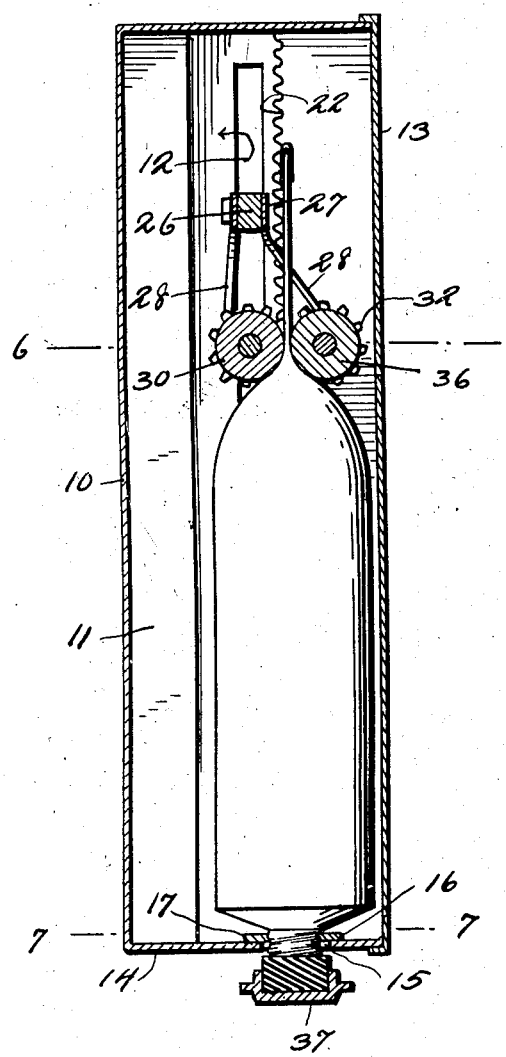
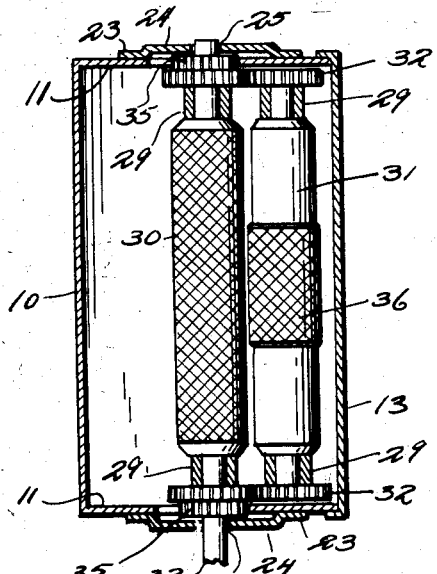
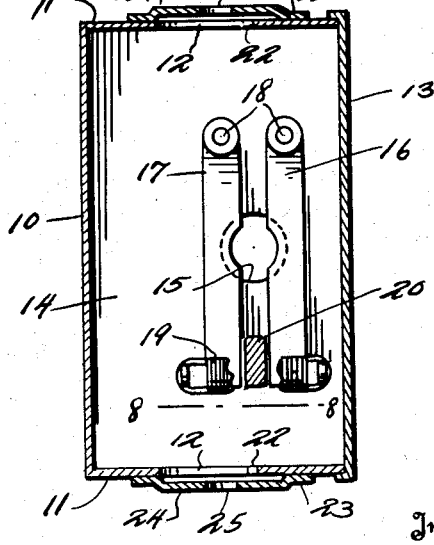

Patented Feb. 16, 1932

1,845,291

UNITED STATES PATENT OFFICE

GEORGE E. KOONTZ, OF SALEM, VIRGINIA

PASTE DISPENSING CABINET

Application filed July 25, 1929. Serial No. 381,023.

This invention relates to dispensing devices and particularly to means for dispensing either tooth paste, shaving cream, facial cream or any like commodity from one of the usual collapsible tubes used for this purpose.

One of the objects of the present invention is to provide a dispensing device of this kind in which the tube may be readily placed, the device having a pair of intergeared rollers movable longitudinally of the casing wherein the tube is placed, one of the rollers having a handle whereby it may be rotated and the rollers receiving between them the paste tube which, as the rollers are rotated, is squeezed and flattened out from its rear end toward its forward end so as to discharge the paste therefrom.

A further object is to provide a device of this character wherein the rollers are spring pressed toward each other so that they may be readily separated for the initial insertion of the rear end of the paste tube, and a most important object is to so form the rollers that they will not only exert a squeezing action upon the tube as they are rotated, but that they will exert a draft upon the tube, pulling the tube out straight backward and preventing the tube from creeping forward in front of the compressing rollers, this being one of the difficulties commonly found in devices of this character.

Other objects will appear in the course of the following description.

My invention is illustrated in the accompanying drawings, wherein:—

Figure 1 is a front elevation of a paste dispenser constructed in accordance with my invention;

Figure 2 is a transverse section through the lower end of the casing and showing the cap for the paste tube and the clamp therefor;

Figure 3 is a section on the line 3—3 of Fig. 1;

Figure 4 is a section on the line 4—4 of Fig. 1;

Figure 5 is a section on the line 5—5 of Fig. 1;

Figure 6 is a section on the line 6—6 of Fig. 5;

Figure 7 is a section on the line 7—7 of Fig. 5;

Figure 8 is a section on the line 8—8 of Fig. 7.

Referring to the drawings, 10 designates an outer casing which as illustrated is rectangular in form and which has the sides 11, each of these sides being formed with a longitudinally extending slot 12. A door or cover 13 is mounted upon the casing in any suitable manner so that access may be had to the interior of the casing. At the lower or forward end of the casing, the end wall 14 is formed with an aperture 15 through which the discharge nozzle or screw-threaded mouth of the collapsible tube may be inserted, and pivotally mounted upon the inside face of the casing are the two jaws 16 and 17 notched upon their confronting edge faces to embrace the mouth of the paste tube. These jaws are pivoted at 18 and are urged toward each other by a spring 19. A cam 20 is disposed between the jaws, this cam having a handle 21 upon the exterior face of the end wall 14 whereby the jaws may be spread apart to permit the insertion or removal of the mouth of the paste tube.

The upper walls of the slots 12 are formed with teeth 22 and attached to the outer opposite faces of the casing are strips 23 which are offset at the middle as at 24 and formed with slots 25. The outer walls of these slots are disposed just outward of the teeth 22.

Extending across the interior of the casing is a supporting cross bar 26 whose ends extend through the slots 25 and slide therein. Mounted upon the upper and lower faces of this cross bar are yokes 27, the extremities of which are angularly extended and constitute spring arms 28, the spring arms of the inner yoke being in divergent relation to the spring arms of the outer yoke. Each of these spring arms at its end is curved to form a bead 29 constituting a bearing and disposed in the bearings thus formed are the inner and outer rollers 30 and 31. The yokes are disposed to engage around these rollers just inward of their outer ends. The outer ends of the rollers carry intermeshing gear wheels 32 whereby the rollers may be rotated with relation to each other and in opposite directions. The inner roller is extended to form a shaft 33 which extends out through the slot 25 and carries a knurled or otherwise formed manipulating head or wheel 34. It will be seen that by rotating this head in one direction, the rollers may be shifted from the delivery end of the machine to the rear or upper end thereof, while when the wheel 34 is rotated in the other direction, the rollers will be rotated to cause the rollers to move toward the delivery end of the machine. The shaft of the innermost roller carries upon it the small gear wheels 35 which engage with the rack teeth 22, thus causing the shifting of the rollers and of the cross bar 26 longitudinally of the casing as the head 34 is rotated in one direction or the other.

The innermost roller is preferably knurled throughout its entire length but the outermost roller 31 has a knurled portion 36 at its middle, the lateral portions of the roller 31 being slightly reduced in diameter. Attention is particularly called to the fact, and it is an important feature of the invention, that the rollers 30 and 31 are larger in diameter than the diameter of the gears 35 so that while both rollers rotate at the same speed, the surface speed of the rollers will be greater than their speed of translation as they move toward the discharge end of the casing.

I have found in actual practice that as the roller carrier consisting of the cross bar and yokes is shifted toward the delivery end of the casing by rotating the head 34, a tension is placed upon the paste tube, tending, as it were, to pull it backward, while the rollers are rotating forward, thus keeping the paste tube from buckling in front of the rollers or causing any tendency of the paste tube to feed forward in front of the rollers as the material is forced out.

In the use of this device, the roller carrier is, of course, disposed at the end of the casing remote from the discharge end. The cap of the paste tube is removed and the paste tube has its nozzle or mouth inserted through the opening 15. The jaws 16 and 17 are then allowed to clasp or engage the paste tube, holding the paste tube firmly in place. The rear end of the tube is then threaded between the rollers by spreading these rollers slightly apart against the action of the spring arms 28, and when the rollers have passed beyond the extreme rear end of the paste tube they are allowed to close upon the paste tube.

The delivery end of the casing is provided with a spring actuated cap 37 which closes against the forward end of the paste tube. When it is desired to discharge paste from the tube, the cap 37 is opened and the head 34 rotated to cause the rollers to roll downward on the paste tube. A very slight movement of the rollers will cause the paste in the tube forward of the rollers to be compressed and forced out through the opening in the paste tube. As the paste is used, the rollers are shifted further and further downward, absolutely flattening out that portion of the paste tube over which the rollers have passed and discharging the paste therefrom.

The surfaces of the rollers have a tractive effect upon the flexible metal from which the paste tube is made, preventing any slipping between the rollers and the paste tube except that after a certain degree of pull is exerted on the tube, the knurled rollers will slip sufficiently to compensate for the difference in their peripheral speed and the rate of speed which the carriage travels toward the mouth of the tube and, as before remarked, the difference in diameter of the rollers and gear wheels 35 causes a stretching effect to be applied to the paste tube, preventing any tendency of the paste tube to move forward or flex in front of the rollers.

While I have illustrated the casing as being applied in an upright position with the paste tube discharging downward, I do not wish to be limited to this, nor do I wish to be limited to the exact form of the gasket or other minor details of construction as these might be varied in many ways without departing from the spirit of the invention as defined in the appended claims.

It will be noted that the roller 31 has its middle portion enlarged and knurled as at 36. This is done so as to guide the paste tube and keep it straight while passing through the rollers. If this middle portion is not enlarged and knurled, this roller will have a tendency to pull the tube off center. Furthermore this reduction in the roller on each side of the middle takes care of the seam or joint that is found in all tubes.

I claim:—

1. In a dispenser of the character described, a case having parallel side walls and having a slot in each side wall, there being a rack extending parallel to each slot, one end of the case being formed with a discharge opening, and means for retaining the mouth of a paste tube in said discharge opening, a roller carrier slidably engaging in said slot, inner and outer rollers supported by said carrier and resiliently urged toward each other, the rollers having intermeshing gears at their ends, gears on one of said rollers meshing with the racks and one of said rollers having a shaft provided with an exterior head whereby the rollers may be rotated in reverse directions, both of said rollers being slightly larger in diameter than the rack gears to secure a difference in peripheral speed.

2. A paste dispensing device of the character described comprising a casing having parallel side walls and an opening at one end adapted to receive the mouth of a paste tube, means at this end of the casing for clamping the paste tube in place and holding it against strain, the side walls of the casing being formed with longitudinally extending slots, toothed racks extending parallel to and adjacent said slots, a cross bar having its ends slidingly engaged in said slots and carrying yokes projecting toward the delivery end of the casing, the yokes being in the form of spring arms, inner and outer rollers mounted in said spring arms, the inner roller having a shaft passing through a slot in the casing and provided with a head whereby it may be rotated, intermeshing gears on the ends of the rollers, gears mounted upon the shaft of the innermost roller and engaging the teeth of the rack whereby to cause the longitudinal travel of the rollers as the rollers are rotated, the surface of said rollers being knurled and both of the rollers being larger than the rack gears whereby to secure a difference between the peripheral speed of the rollers and the longitudinal travel thereof.

3. A dispensing device of the character described comprising a casing having side walls formed with longitudinally extending slots, the outer wall of each of said slots being formed with rack teeth, outer strips applied to the side walls of the casing and longitudinally slotted, the slots being narrower than the slots in the casing, the discharge end of the casing having means for receiving and clamping the discharge mouth of a paste tube, a cross bar having its ends disposed in the slots in said strips and movable longitudinally therein, inner and outer yokes mounted upon the cross bar and having resilient arms formed with bearings at their extremities, outer and inner transversely extending rollers mounted in said bearings and movable with the cross bar, the extremities of the rollers being provided with intermeshing gears, the inner roller having a shaft extending through said slots in the strips and adapted at one end to carry a head, and a gear wheel mounted upon the shaft and engaging said rack teeth, said rollers being knurled and one of the rollers being of a larger diameter than the rack engaging gear wheels.

4. In a dispenser of the character described, a casing having a discharge opening, means for retaining the mouth of a paste tube in said discharge opening, a roller carrier mounted in said casing for longitudinal movement, inner and outer rollers supported by said carrier and resiliently urged toward each other, the rollers having intermeshing gears at their ends, and means for causing the travel of the rollers longitudinally of the tube at a speed less than the peripheral speed of the rollers, one of said rollers having its middle portion enlarged relative to its end portions, its middle portion being less in width than the width of the paste tube and being knurled.

5. In a dispenser of the character described, a pair of rollers, a roller carrier upon which the rollers are mounted, a support within which the roller carrier is movable, means on the support for gripping the mouth of a paste tube, the rollers engaging on opposite sides of the paste tube, means for rotating the rollers and simultaneously causing them to travel toward the mouth of the paste tube, one of said rollers having a knurled face extending the entire length of the roller, the other of said rollers having a knurled face less in length than the width of the paste tube when flattened, whereby the tube may be guided straight as it passes between the rollers, and means causing the member and said rollers to relatively move toward each other at a speed less than the peripheral speed of the rollers.

6. In a dispenser of the character described, a member having a discharge opening, and means for engaging the mouth of a dispensing tube therewith, a pair of manually rotatable rollers disposed behind said member and adapted to receive between them the body of the dispensing tube, the rollers having intermeshing gears and means causing the member and said rollers to relatively move toward each other at a speed less than the peripheral speed of the rollers.

7. In a dispenser of the character described, a member having a discharge opening, and means for engaging the mouth of a dispensing tube with said discharge opening, a pair of manually rotatable rollers disposed rearward of the discharge opening and adapted to receive between them the body of a dispensing tube, means resiliently urging said rollers toward each other, the rollers having intermeshing gears at their ends, and means for causing the travel of the rollers relative to the tube and relatively toward said member at a speed less than the peripheral speed of the rollers.

In testimony whereof I hereunto affix my signature.

GEORGE E. KOONTZ.